US010583381B2

(12) United States Patent
Falc'hon et al.

(10) Patent No.: US 10,583,381 B2
(45) Date of Patent: Mar. 10, 2020

(54) FUEL FILTER AND CARTRIDGE FOR SUCH A FILTER WITH AN ONBOARD ADDITIVE TANK

(71) Applicants: SOGEFI FILTRATION FRANCE, Guyancourt (FR); RHODIA OPERATIONS, Paris (FR)

(72) Inventors: Jean-Jacques Falc'hon, Velizy Villacoublay (FR); Christophe Guillon, Vire (FR); Guy Monsallier, Granville (FR); Virginie Harle, Senlis (FR); Antoine Lacarriere, Ciichy (FR)

(73) Assignees: Sogefi Filtration France, Guyancourt (FR); Rhodia Operations, Paris (FR)

( * ) Notice: Subject to any disclaimer, the term of this patent is extended or adjusted under 35 U.S.C. 154(b) by 276 days.

(21) Appl. No.: 15/102,330

(22) PCT Filed: Dec. 10, 2014

(86) PCT No.: PCT/FR2014/053259
§ 371 (c)(1),
(2) Date: Jun. 7, 2016

(87) PCT Pub. No.: WO2015/086995
PCT Pub. Date: Jun. 18, 2015

(65) Prior Publication Data
US 2016/0317958 A1    Nov. 3, 2016

(30) Foreign Application Priority Data

Dec. 12, 2013  (FR) ..................... 13 62532

(51) Int. Cl.
*B01D 29/11*    (2006.01)
*B01D 35/00*    (2006.01)
(Continued)

(52) U.S. Cl.
CPC .......... *B01D 37/025* (2013.01); *B01D 29/114* (2013.01); *B01D 35/005* (2013.01);
(Continued)

(58) Field of Classification Search
CPC combination set(s) only.
See application file for complete search history.

(56) References Cited

U.S. PATENT DOCUMENTS 3,392,753 A    7/1968  Kleinmann
3,720,230 A    3/1973  Miller et al.
(Continued)

FOREIGN PATENT DOCUMENTS

CA    2270093    10/2000
DE    40 28 253    7/1991
(Continued)

OTHER PUBLICATIONS

English translation of Written Opinion of PCT/FR2014/053259 dated Apr. 29, 2015, pp. 1-8.
(Continued)

*Primary Examiner* — Bobby Ramdhanie
*Assistant Examiner* — Michael J An
(74) *Attorney, Agent, or Firm* — McDonnell Boehnen Hulbert & Berghoff LLP (57) ABSTRACT

In a filter cartridge (CC) for a fuel filter, the filter element (4) and the additive module are connected and typically stacked so as to allow them to be integrally inserted into a filter housing. The substantially annular filter medium (5) delimits an inner space (9) into which at least one part (24) of the attachment end of the additive module can be engaged. The liquid additive is stored in a casing forming a tank (13) that is placed at a fuel pressure and delimits an internal volume (V2) that can be varied so as to maintain an identical pressure between the liquid additive and the fuel at the
(Continued)

periphery (V3) of the tank (13). The additive module has an external connection (28) with a liquid additive outlet pipe (12a), said external connection (28) including sealing means (37, 38) for automatically closing the outlet pipe in a fluidtight manner when the external connection is in a disengaged state.

18 Claims, 6 Drawing Sheets

(51) Int. Cl.
*B01D 35/153* (2006.01)
*B01D 37/02* (2006.01)
*F02M 31/125* (2006.01)
*F02M 37/22* (2019.01)

(52) U.S. Cl.
CPC ......... *B01D 35/153* (2013.01); *F02M 31/125* (2013.01); *F02M 37/22* (2013.01); *B01D 2201/208* (2013.01)

(56) References Cited

U.S. PATENT DOCUMENTS

| | | | |
|---|---|---|---|
| 4,265,748 A * | 5/1981 | Villani | B01D 27/08 210/132 |
| 4,736,769 A | 4/1988 | Belanger | |
| 4,755,289 A * | 7/1988 | Villani | B01D 27/08 210/132 |
| 6,223,526 B1 | 5/2001 | Wissler et al. | |
| 6,860,241 B2 * | 3/2005 | Martin | B01D 27/00 123/1 A |
| 7,931,817 B2 * | 4/2011 | Bilski | B01D 27/08 137/2 |
| 2003/0188474 A1 | 10/2003 | Cook et al. | |
| 2005/0167351 A1 | 8/2005 | Herman et al. | |

FOREIGN PATENT DOCUMENTS

| | | | |
|---|---|---|---|
| EP | 0 671 205 | 9/1995 | |
| EP | 1 061 251 | 12/2000 | |
| EP | 1 344 813 | 9/2003 | |
| FR | 2 312 062 | 12/1976 | |
| FR | 2 668 203 | 4/1992 | |
| GB | 2 254 610 | 10/1992 | |
| WO | 1997/19022 | 5/1997 | |
| WO | 2001/10545 | 2/2001 | |
| WO | 2003/053560 | 7/2003 | |
| WO | 2005014994 | 2/2005 | |
| WO | 2005/113279 | 12/2005 | |
| WO | 2008/116550 | 10/2008 | |
| WO | 2010/150040 | 12/2010 | |
| WO | WO 2014/135935 A1 * | 9/2014 | B01D 37/02 |

OTHER PUBLICATIONS

English translation of the International Search Report of PCT/FR2014/053259 dated Apr. 29, 2015, pp. 1-2.

* cited by examiner

FUEL FILTER AND CARTRIDGE FOR SUCH A FILTER WITH AN ONBOARD ADDITIVE TANK

This application is a U.S. national phase of International Application No. PCT/FR2014/053259, filed Dec. 10, 2014, which claims priority from French Patent application no. FR 1362532, filed Dec. 12, 2013, the disclosure of each of which is hereby incorporated by reference in its entirety.

TECHNICAL FIELD OF THE INVENTION

The present invention relates to fuel filters, and in particular to diesel fuel filters comprising a filter cartridge as well as an additive tank intended for the fuel circuit.

BACKGROUND OF THE INVENTION

A fuel filter of the above type typically comprises a fuel inlet and outlet, and in a fuel supply circuit for a diesel engine allows filtering the diesel fuel to remove impurities. The additive tank is housed in the filter housing and contains a liquid additive, for improving fuel quality and in particular fuel distribution in the engine, engine performance, engine stability during operation, and/or for facilitating the regeneration of the particulate filter. This type of liquid additive is typically useful for improving engine durability. Document WO 2012/104552 describes such a filter type, and non-limiting examples of liquid additives are provided at the end of the description in that document.

It is advantageous to be able to dispense the liquid additive without requiring high-precision metering pumps or managing an associated calculator, in order to reduce the cost of the additive dispensing device.

One advantage of the dispensing mode described in document WO 2012/104552 is the ability to extend the service period of the additive tank by limiting or even stopping the supply of additive in order to prevent, under certain conditions, excessive concentration of additive in the fuel. It also optimizes the concentration of additive in the fuel in order to find a compromise between the amount that is necessary and sufficient, and an excessive concentration which can reduce the service period of the additive tank and/or have a negative impact on other vehicle elements, such as clogging the particulate filter. For this purpose, the liquid additive is released by the effect of a pressure difference, the additive being placed in an inner flexible bag or casing with a fluidtight movable wall and being at the same pressure as the fuel placed in an outer casing of the additive chamber. Typically, the pressure difference can result from positive pressure exerted by the fuel or negative pressure near a dispensing port for the additive liquid.

An assembly combining a filter element and an additive chamber is relatively complex to assembly, however, especially if one wants this assembly to form a removable cartridge that is replaced as one piece. It is therefore difficult, for the user or operator performing the replacement, to disconnect/connect such a fuel circuit cartridge, particularly for the following reasons:

connection to the dispensing circuit must be done with precision and as simply and quickly as possible;
contact between the user's skin and the liquid additive contained in the tank may be hazardous for the user.

In document WO 2012/104552, it is required that the additive tank be arranged inside a removable external cartridge housing that is typically at the base of the external housing. There is then a loss of flexibility in the filter architecture, to the extent that attachment of the filter under the hood must be done with a filter head (cover).

A type of spin-on cartridge incorporating an additive dispensing function is known from document US 2009/0206024 A1. In this case, there is again a loss of flexibility in the filter architecture. In addition, the method of dispensing by progressive deformation of a heat sensitive material does not prevent leakage of liquid additive, which can hazardous to a user performing a replacement operation.

GENERAL DESCRIPTION OF THE INVENTION

The present invention aims to provide a cartridge for a fuel filter with liquid additive tank which is more attractive in relation to the problem of installation in the obstructed environment of a motor vehicle combustion engine.

To this end, the invention proposes a filter cartridge engaging in a fuel filter (with all or part of a filter housing), the filter cartridge comprising:

a filter element comprising a first end, a second end, and a substantially annular filter medium extending between these two ends;
an additive module comprising:
    a casing forming a liquid additive tank suitable for being brought to a fuel pressure and which delimits a variable internal volume whereby an identical pressure is maintained between the liquid additive contained in the internal volume and the fuel,
    a liquid additive outlet pipe, the liquid additive being suitable for mixing with the fuel flowing in a fuel circulation circuit,
    an attachment end in contact with the filter element, whereby the filter element and the additive module define a unit suitable for attachment removably and as a single part to a housing portion of a fuel filter housing,
    an external connection which comprises the liquid additive outlet pipe, the external connection having sealing means for automatically closing the liquid additive outlet pipe in a fluidtight manner when the external connection is in a disengaged state.

With these arrangements, the replacement portion can be simple in design and at least one main portion, or both portions, of the associated filter housing can be kept, with the advantage of being able to attach the filter to the vehicle by one or the other of these two portions. The self-sealing external connection is also advantageous for preventing any contact of the additive liquid with the user during replacement steps.

It is understood that the term "automatically closing" means that the closure is achieved without significant delay from the operator's point of view. Upon detachment (disconnection) from the associated housing portion, a closed state is obtained instantly.

The term "connection" should be understood here to mean a connecting element which ensures continuity between two different (initially separated) parts. In particular, it concerns a connection that enables assembly (without leakage) to a line having a complementary connecting endpiece. It is therefore understood that in no case can a moving valve be taken for such a connection. Such a connection typically has an outwardly projecting annular edge.

According to one feature, the second end of the filter element is engaged with the attachment end so as to stack and/or nest the filter element and the additive module, whereby the filter element and the additive module define a unit adapted for integral insertion into a fuel filter housing (which typically comprises a bowl and a cover). The stacking and/or nesting, typically with a relative axial extension between the auxiliary module and the filter element, makes it easy to manipulate the cartridge. Both portions of the associated filter housing can be kept.

The support function provided by the filter element facilitates loading the filter cartridge and may limit access to the additive outlet pipe, particularly when the latter opens into the inner space defined by the filter-medium.

According to one feature, the filter medium has an inner face which defines an inner space, the additive module consisting of an additive chamber which comprises:
  an outer casing defining a peripheral volume around the additive tank and having at least one fuel port allowing fuel to enter the peripheral volume,
  the additive tank, which extends inside the outer casing and has at least one flexible fluidtight portion such as a movable wall to allow the internal volume to vary,
    the liquid additive outlet pipe being distinct from the fuel port and extending within or adjacent to the inner space by traversing the attachment end. It is thus understood that the additive tank with flexible wall is not accessible and the outlet pipe (which can extend at a distance from the ends of the cartridge) is protected by the filter medium.

According to another feature, the second end of the filter element comprises a flange that is proximal relative to the additive chamber, the attachment end of the additive chamber being retained by this proximal flange and/or by a reinforcing member of the filter element which lies in the inner space. This type of retention provides a reliable connection while reducing the spacing between the filter element and the additive chamber. The integrity of the filter medium is maintained by the use of the proximal flange (which is for example made of molded plastic material), and preferably also by the reinforcing member which may surround the area of attachment area with the external connection, as the use of a distal flange also helps to maintain the integrity of the filter medium.

In preferred embodiments of the invention, one or more of the following arrangements may possibly be used:
  the fuel port opens into said inner space.
  the attachment end of the additive chamber comprises an annular part (one piece) which extends around the liquid additive outlet pipe, the retention being achieved by nested insertion of said attachment end into the inner space with engagement of the annular part against or beyond an abutment that is part of the filter element (assembly is thus fast and simple and ensures correct positioning of the additive chamber);
  the outer casing of the additive chamber is obtained by fluidtight connection of the annular part to a vessel and provides a single opening defined by the external connection, the annular part having a dome shape and comprising a large annular edge connected to the vessel and at least one small annular edge defining a passage for the external connection when the latter is separate and is inserted through the annular part;
  the proximal flange, preferably a single piece, comprises a radial portion which covers an axial end of the filter medium, said radial portion having an annular form and defining an opening traversed by the external connection, and an extension portion distinct from the radial portion, having an annular guiding and/or sealing surface in contact with an annular surface portion of the attachment end (this configuration of the proximal flange facilitates assembly while reducing the spacing between the filter element and the tank; the extension portion may further allow attaching or maintaining the position of the reinforcement member);
  the second end of the filter element comprises a flange which forms part of the outer casing and is sealingly connected to a vessel of the additive chamber;
  the external connection comprises a rigid body formed as a single piece and defining the liquid additive outlet pipe, and at least one movable member (in contact with the rigid body) such as a valve placed in the liquid additive outlet pipe, the additive tank comprising a wall made as a single piece which comprises the rigid body;
  the sealing means, for example in the form of a self-sealing member, comprise a shutter valve, which is preferably urged by default into a closed position by a resilient biasing member such as a spring (this configuration minimizes the volume of the valve in the external connection, which allows lengthening the section engaging with the complementary connecting end-piece that is part of the housing);
  the sealing means can be actuated by external thrust, to obtain an open position;
  the external connection extends longitudinally between a first end where the liquid additive outlet pipe opens into the internal volume of the additive tank and a second end where the additive outlet pipe opens into the inner space;
  the second end of the external connection extends beyond the sealing means (which are placed inside the additive outlet pipe, recessed relative to the opening in communication with the inner space);
  the filter element has an additional flange that is distal relative to the additive chamber and forms a cartridge end, the additive chamber comprising a rigid base located opposite said cartridge end, the fuel port and the second end of the external connection being arranged in the additive chamber so as to be opposite the rigid base and closer to the proximal flange than to the distal flange.
  the distal flange has a central opening having a first inner diameter (D1), the proximal flange has a central opening having a second inner diameter (D2), and the additive chamber defines a maximum outer diameter (D3) such that:

$$0.5 \leq D1/D3 \leq 1 \text{ and } 0.5 \leq D2/D3 \leq 1$$

(with these arrangements, the cartridge has an optimized size that reduces the dimensions of the filter housing, and a relatively large cylindrical volume is provided in the inner space to house a solenoid valve or similar component for actuating the distribution of additive). Of course, alternatively one can reduce the outer diameter of the additive chamber, for example by accommodating a portion of the additive tank in the inner space.

The invention also aims to provide a fuel filter with an on-board additive tank adapted to optimize the concentration of additive in the fuel.

To this end, a fuel filter is provided comprising a filter cartridge according to the invention and comprising a housing for accommodating the filter cartridge, the housing comprising:
  at least one fuel inlet port;
  at least one fuel outlet port;
  a port for dispensing liquid additive into a fuel circulation circuit for an internal combustion engine, the additive dispensing port being distinct from the fuel inlet and outlet ports; and a dispensing head which comprises the dispensing port for releasing additive into the fuel circulation circuit, a connecting endpiece adapted to engage with the external connection, and a distribution channel for circulating the liquid additive from the connecting endpiece to the dispensing port, the connecting endpiece engaging with the sealing means so that the distribution channel is in communication with the additive tank when the connecting endpiece is in an engaged state with the external connection.

According to one feature, the housing is formed by assembling a cover comprising the dispensing head with a bowl, the dispensing head being intended for assembly with the cover, preferably permanently affixed to the fuel circulation circuit, the cover comprising the fuel inlet port and outlet port, said cartridge being removably mounted on the cover, the distribution channel extending into the inner space (with this configuration, the footprint of the cover is optimized).

According to another feature, the filter element is sealingly interposed between an upstream area around the filter cartridge, which is in communication with the fuel inlet port, and a downstream area which includes the inner space and is in communication with the fuel outlet port, the attachment end of the additive module being in radial sealing contact against an annular surface portion of the proximal flange, at a distance from the external connection. It is thus possible to route the filtered fuel centripetally to the interior of the additive chamber (which maximizes the filter medium surface area on the upstream side). In addition, the respective fuel port(s) of the additive chamber can open into the inner space, so that the fuel flowing around the tank is filtered (eliminating the risk of a flexible wall of the tank becoming stiff from the accumulation of impurities). And when the additive is dispensed via the venturi effect, the pressure difference at the venturi is allowed to be constant over time (according to a given flow rate of the diesel fuel flowing into the filter), which is not the case if the fuel inside the additive chamber is not filtered, due to the head loss at the filter element which would increase over time (as the filter element becomes loaded). It is preferred to avoid this creep and not be subject to possible fluctuations in the pressure differences between inside and outside the additive tank (pressure differences which would vary over time for a given fuel flow).

According to another feature, the filter comprises a means for generating a pressure difference between the fuel inlet or outlet port and the additive dispensing port, and a device for selectively sealing, totally or partially, said distribution channel, engaged in the inner space.

According to another feature, a heating device configured to heat the additive upstream of the dispensing port is provided, preferably between the connecting endpiece and an inlet of the distribution channel.

Also proposed according to the invention is a kit for assembling a fuel filter cartridge, this kit comprising:
- a filter element of the annular filter medium type, extending between a first flange and a second flange;
- an additive chamber comprising an at least partially-flexible casing forming a liquid additive tank and an outer casing provided with at least one fuel port so that a flexible portion of the additive tank is brought to a fuel pressure;

the additive chamber having an attachment end provided with an external connection and adapted to be sealingly attached through the first flange of the filter element and inserted into the inner space delimited by the filter medium, the filter element comprising an access passage through the second flange, this access passage extending into the inner space to the vicinity of the first flange to permit insertion of the connecting endpiece of an additive dispensing component all the way to the external connection, the external connection comprising the single liquid additive outlet pipe of the additive chamber and sealing means for automatically closing the liquid additive outlet pipe when the external connection is in a disengaged state.

According to one feature, a spring may also be mounted on the cartridge of the assembly kit, typically at an axial end of the cartridge, and/or a gasket may be mounted on the filter element (for example on the second flange, which is distal to the additive chamber).

According to one feature, the external outlet of the fuel port is on the same side as the liquid additive outlet pipe, between an attachment area and the external connection.

BRIEF DESCRIPTION OF DRAWINGS

Other features and advantages of the invention will be apparent from the following description of several embodiments given as non-limiting examples, with reference to the accompanying drawings in which.

DESCRIPTION OF PREFERRED EMBODIMENTS OF THE INVENTION

In the various figures, identical references indicate identical or similar elements.

Figure 1:
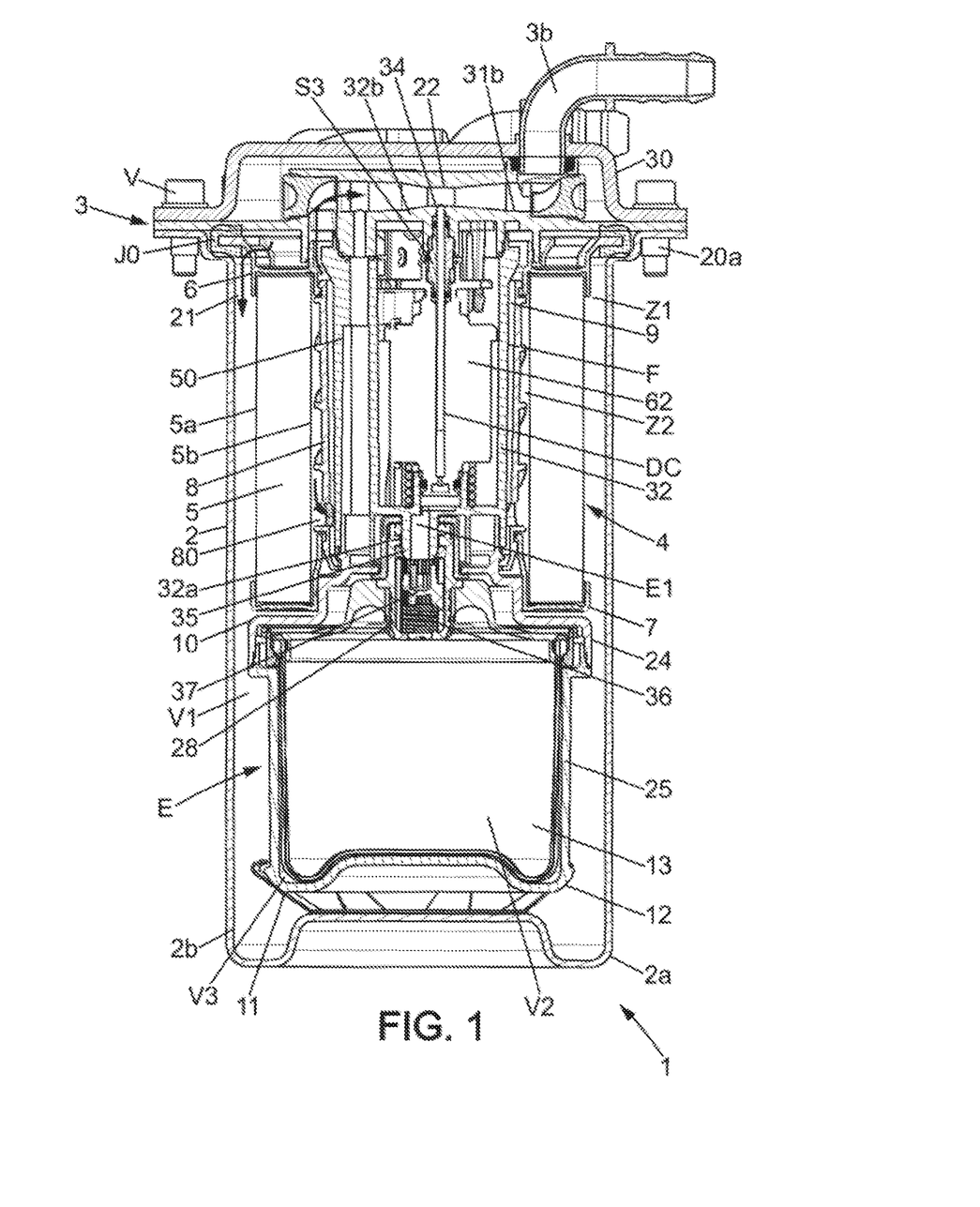
FIG. 1 is a sectional view of a fuel filter with a filter cartridge according to the invention.
Figure 2:
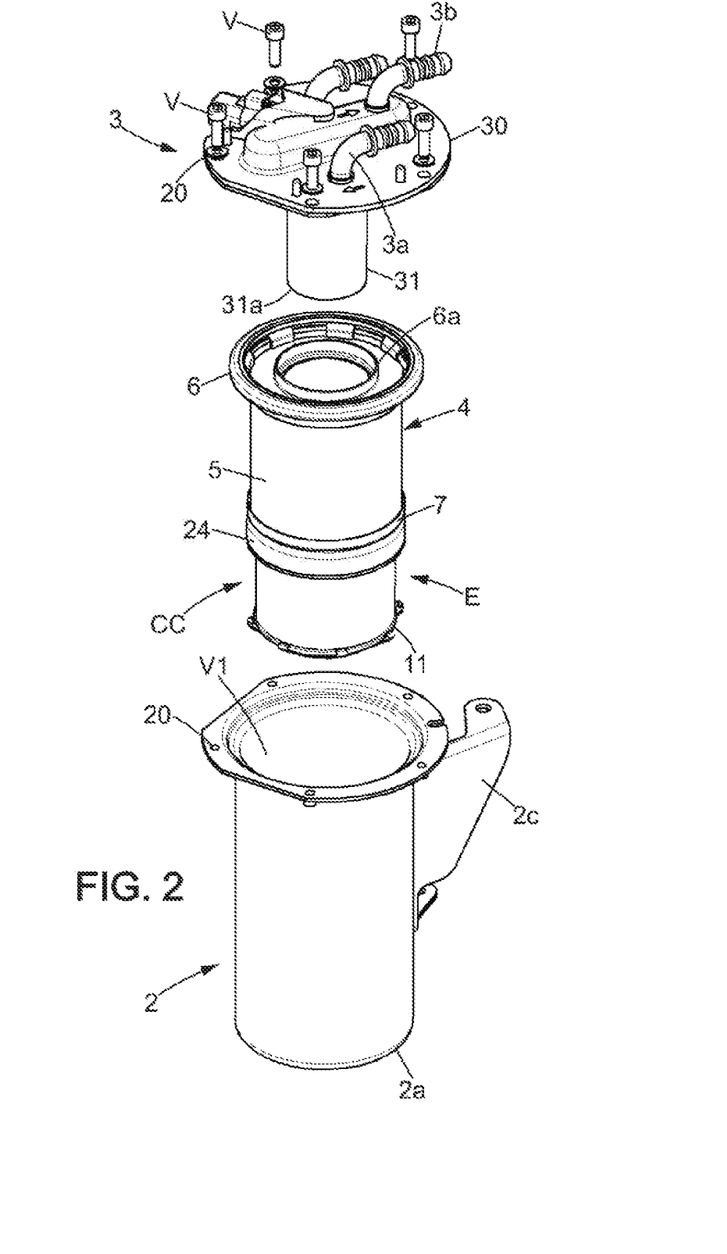
FIG. 2 is an exploded perspective view of the filter of FIG. 1.

FIGS. 1 and 2 show an embodiment of the fuel filter (for diesel or similar fuel) supporting an additive module, preferably in the form of an additive chamber E. This filter 1 comprises a housing (2, 3) having an upper wall (here formed by a sealing wall 30) and a lower wall. In the non-limiting example of the figures, the lower wall of the housing (2, 3) is formed by a bowl 2 of metal or plastic. The bowl 2 has a base 2a from which a side wall 2b extends upwardly, said side wall here being substantially cylindrical and having an upper rim directly secured to a cover 3 forming the upper wall of the housing (2, 3). This cover 3 has an edge that is attached directly to the annular edge (here circular) of the bowl 2. More generally, it is understood that the cover 3 is connected to the bowl 2 in a fluidtight manner. In the specific and non-limiting configuration of FIG. 1, there is no direct seal between the bowl 2 and the cover 3 but a seal is still provided by the gasket J0 which is on the flange 6. It is thus ensured that the gasket J0 will be changed during replacement because here it is connected to the filter element 4. In other configurations, a gasket may be mounted directly between the bowl 2 and the cover 3 without involving a third part.

The edge of the cover 3 may be, for example, screwed to the edge of the bowl 2 by means of multiple screws V passing through holes 20 and engaging with nuts 20a, or by means of a peripheral thread, in a known manner.

As illustrated in FIG. 2, this cover 3 has an inlet port 3a for fuel to be filtered and an outlet port 3b for filtered fuel, to allow the circulation and filtration of fuel inside the filter 1. The housing (2, 3) is interchangeably connectable to lines of a fuel supply system of a vehicle with combustion engine. In this example, the cover 3 forms a filter head having a "T" cross-section and comprises:

a sealing portion 30 which extends transversely above the bowl 2 and which may incorporate the inlet port. 3a for unfiltered fuel and the outlet port 3b for filtered fuel; and an insertion portion 31 which extends longitudinally between a lower end 31a and an upper end 31b where it connects to the sealing portion 30.

The housing formed by the bowl 2 and the cover 3 defines an internal volume V1 in which is arranged the additive chamber E (or more generally an additive module provided with the tank 13) and a filter element 4 of annular shape which extends along a longitudinal axis A. The longitudinal axis A is preferably a central axis of symmetry of the filter element 4 and possibly also corresponds to a central axis of the additive chamber E. Here the filter element 4 comprises a filter medium 5, a first flange at a distance from the additive chamber E and referred to in the following as the distal flange 6, and a second flange near the additive chamber E and referred to in the following as the proximal flange 7. The filter medium 5 preferably extends around the longitudinal axis A which may possibly be coincident with the axis of symmetry of the bowl 2 when the wall 2b is cylindrical for example. The filter element 4 may optionally comprise a reinforcing member 8 or an internal connecting structure between the two flanges 6, 7. The reinforcing member 8 here has a substantially tubular shape which stiffens the filter element 4 and which can channel the fuel. The reinforcing member 8 extends here between the distal flange 6 (the upper flange in FIG. 1) and the proximal flange 7 (the lower flange in FIG. 1).

Of course, other embodiments of the filter element 4 may be used, for example with only the proximal flange 7 or without any axial flange, the reinforcing member 8 in this case possibly being held in position by contact with the inner face 5b of the filter medium 5. It is also possible to have a configuration without a reinforcing member 8.

Figure 3:
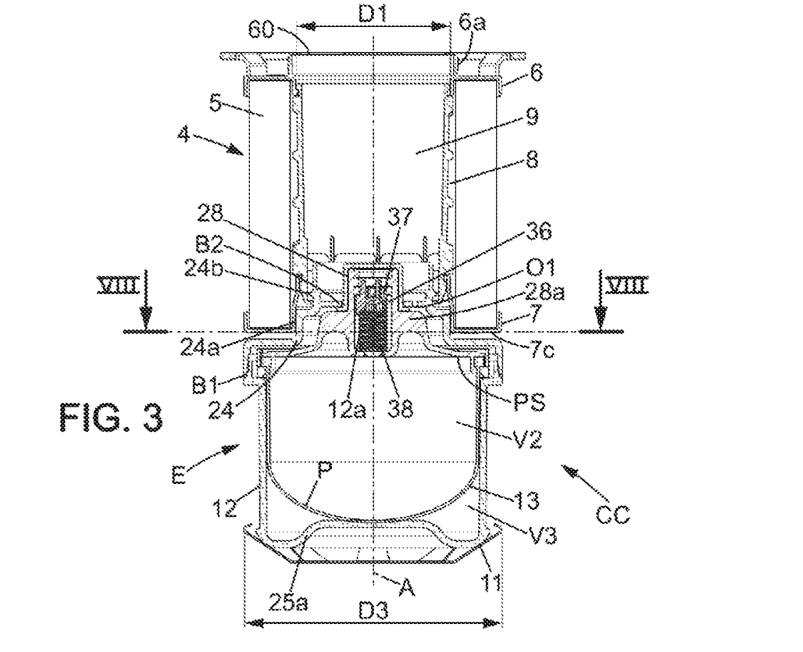
FIG. 3 is a longitudinal sectional view of a filter cartridge with additive chamber, usable in the filter of FIG. 1.

In the non-limiting example shown, the filter element 4 and the additive module, here the additive chamber E, are stacked and are secured to one another to define a combined filter cartridge CC which is clearly visible in FIGS. 2 and 3. This cartridge CC extends for example longitudinally from the base of the additive chamber E, possibly provided with a spring 11, to the distal flange 6, possibly provided with a gasket J0 (forming the seal between the cover 3 and the bowl 2) which forms a cartridge end, as shown in FIG. 2. In the combined filter cartridge CC, an inner space 9 is defined by the inner face 5b of the filter medium 5. The additive module, here formed by the additive chamber E, has an attachment end 10 which can be partially inserted into the inner space 9 and enables attachment on the proximal flange 7 and/or on the reinforcing member 8 of the filter element 4. The attachment end 10 may additionally be in sealing contact, for example a radial annular contact, against a tubular portion of the proximal flange 7. In an option which renders the additive module inseparable from the filter element 4, the proximal flange 7 is secured to or is incorporated into the attachment end 10.

Alternatively, the attachment end 10 may extend below the inner space 9 and connect in a fluidtight manner to the radial portion 7c (covering the lower axial end 5c of the filter medium 5) of the proximal flange 7.

Although the following description refers to an additive tank 13 that forms part of an additive chamber E of the type comprising an outer casing 12 closed on the side opposite the attachment end 10, it is understood that other configurations of the tank 13 can be used in an additive module. For example, a wall P of the tank 13 may be in direct contact with fuel located near the base 2a of the housing (2, 3), and the outer casing 12 may be replaced by a rigid structure provided with openwork or through-holes to bring the tank 13 to fuel pressure. It is thus understood that the external structure of the additive module may simply comprise rigid elements and the attachment end 10 which preferably engages in the inner space 9.

The combined filter cartridge CC corresponds to a unit which can be integrally inserted into the housing (2, 3). The cartridge CC comprises an end adapted to abut against the base 2a of the bowl 2 and optionally having a spring 11 connected to the outer casing 12 of the additive chamber E, or integral with the base 2a. The cartridge CC is detachably mounted on the cover 3. A sealed connection may be provided between a projecting portion of the distal flange 6, or an associated gasket, and an annular sealing surface formed on the inner-surface side of the sealing portion 30. Alternatively, the sealed connection can be achieved by contact of a sealing lip of the filter element 4 against a peripheral annular surface of the insertion portion 31. More generally, an annular sealing contact is obtained so that the cover 3 and the filter element 4 define (in the assembled configuration of the cartridge CC) an area Z1 upstream of the filtration, that is in communication with the inlet port 3a, and an area Z2 downstream of the filtration, that is in communication with the outlet port 3b.

Due to the detachable nature of the cartridge CC, the bowl 2 and the cover 3 are reusable parts. One or the other of these parts can be connected to the vehicle by an attachment interface. In the non-limiting example of FIG. 2, one can see that the bowl 2 comprises at least one lateral extension 2C which enables such attachment. For ergonomic reasons, the sealing portion 30 of the cover 3 may be relatively flat and devoid of any actuator member for controlling the dispensing of additive. In addition, at least a portion of the additive tank 13 may be housed in the inner space 9.

As illustrated in FIG. 1, the cover 3 integrates a liquid additive dispensing head 32. This dispensing head 32 is part of the insertion portion 31 and extends parallel to the longitudinal axis A between:

a first axial end 32a including an additive inlet E1 in communication with the interior of the additive tank 13 of the additive chamber E; and a second axial end 32b provided with a dispensing port 34 for the liquid additive which opens into the fuel outlet 3b.

Figure 5:
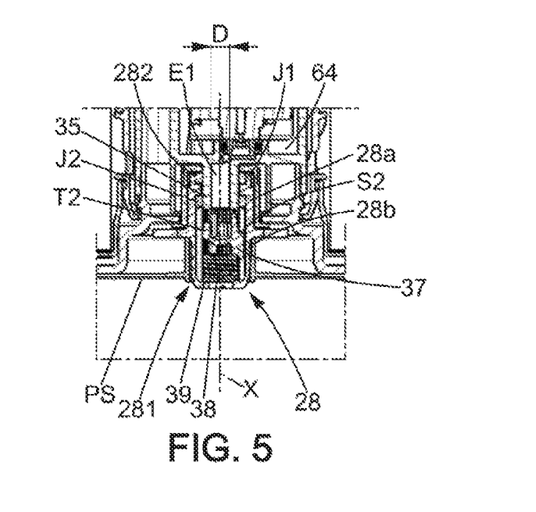
FIG. 5 shows a detail view of a variant filter cartridge usable in the filter of FIG. 1.

It is understood that the dispensing head 32, which comprises the dispensing port 34 for releasing additive into a fuel circulation circuit C1, includes a distribution channel DC for circulating the liquid additive from the additive inlet E1 to the dispensing port 34. The additive inlet E1 may be defined by a connecting endpiece 35 which forms a portion of the first axial end 32a. The connecting endpiece 35 is, for example, a male connection and has a tubular shape as shown in FIG. 5.

Figure 9A:
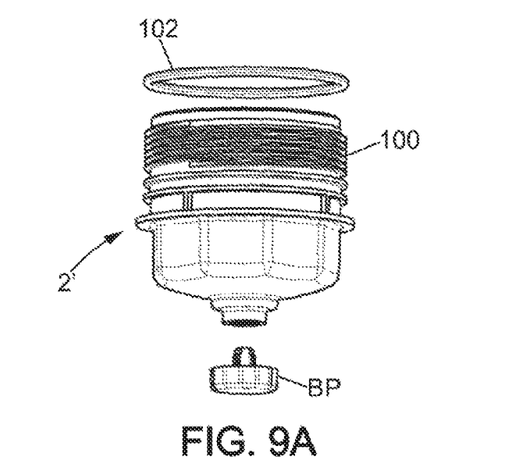
FIGS. 9A and 9B show housing portions usable in an embodiment of the invention.
Figure 9B:
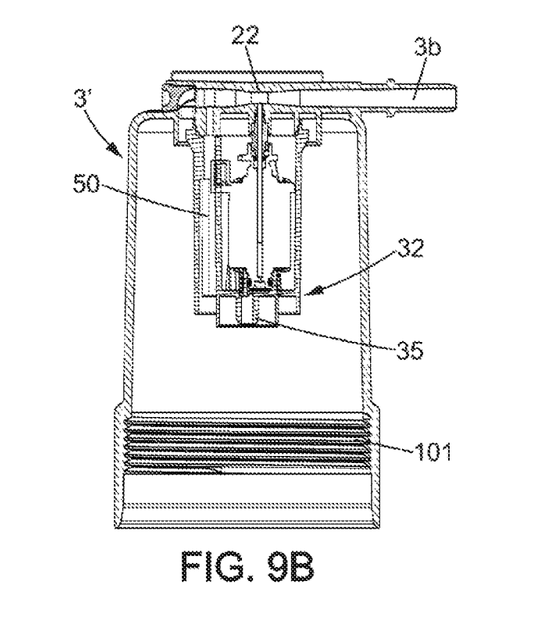

In the embodiment of FIGS. 9A and 9B, the cartridge CC can be disassembled from the bottom, the dispensing head 32 remaining fixed relative to the motor vehicle during replacement. In this example, the bowl 2 is replaced by a removable member 2' which may have a drain plug BP. Water which can be separated out by means of the filter element 4 can be selectively removed using this drain plug BP. The thread 100 of the removable member 2' engages with the thread 101 of the casing member 3', and an annular gasket 102 ensures fluidtight attachment of the filter housing. It is understood that in this type of filter housing, the cartridge CC shown in FIGS. 3-4 or the one shown in FIG. 6 can be mounted in an identical manner and can function the same as with the housing shown in FIGS. 1-2.

Figure 7:
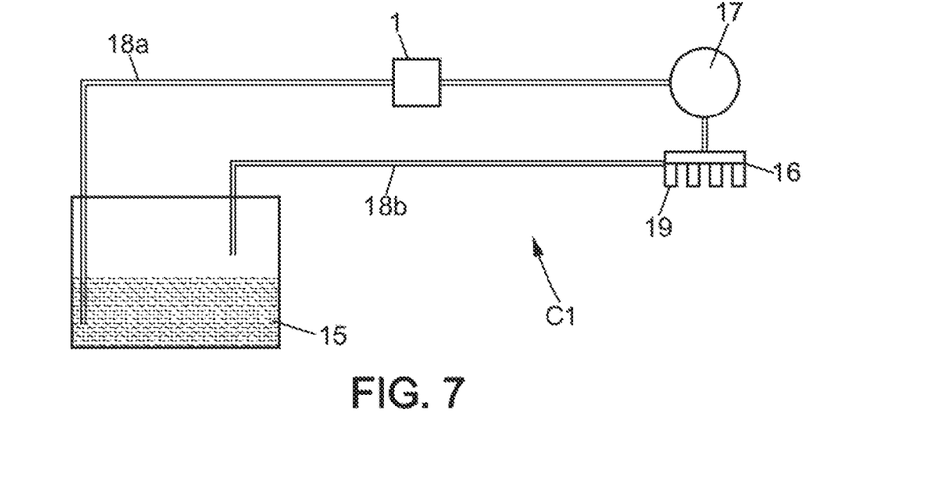
FIG. 7 schematically represents one possible arrangement of a filter having an additive dispensing function according to the invention, in a fuel circulation circuit for an internal combustion engine.

Referring to FIG. 7, an exemplary integration of the filter 1 into a fuel circuit will now be briefly described.

FIG. 7 schematically represents a fuel circulation circuit C1 for an internal combustion engine with a fuel filter 1. Conventionally, the fuel circulation circuit C1 is located between a fuel tank 15 and the common rail 16, and ensures the flow of fuel between the tank 15 and the common rail 16. The circulation circuit here comprises the filter 1 which is intended to filter the fuel, and a high-pressure pump 17. The high-pressure pump 17 and the common rail 16 constitute the fuel injection system. A first line 18a, called the "supply line", ensures the flow of fuel from the tank 15 to the common rail 16, and a second line 18b, called the "return line", ensures the flow of fuel from the injection system into the tank 15. The fuel is therefore pumped into the tank 15, then filtered in the filter 1 and supplied under pressure, via the pump 17, to the common rail 16; then a portion is directed to the injectors 19 of the engine and another portion is returned to the tank 15 through the return line 18b. Part of the fuel may also be sent from the high-pressure pump 17 to the return line 18b.

Due to the configuration of the cartridge CC in the filter 1 with additive chamber E connected to dispensing head 32, the fuel circulation circuit C1 also causes liquid additive to flow to the common rail 16. In a preferred embodiment, the filter 1 has a dispensing port 34 leading to the supply line 18a, as shown in FIG. 7. However, it is also possible for the dispensing port 34 to open into a different line, for example to dispense liquid additive into the return line 18b.

An example flow of fuel in the filter 1 will now be described with reference to FIGS. 1 and 2.

Unfiltered fuel, which typically comes from the fuel tank 15, is introduced into the housing (2, 3) by the inlet port 3a and is routed into the internal volume V1 within an annular space 21 of the upstream area Z1 formed around the cartridge CC and which is delimited in particular by the outer face 5a of the filter medium 5. The fuel to be filtered, for example diesel fuel, can pass through the filter medium 5, which retains impurities including solids and possibly water (for example if a hydrophobic fabric is added or if the reinforcing member 8 includes a water separator tube with overmolded hydrophobic fabric). The filter medium 5 can be of a type known per se and will not be further described here.

After passing through the filter medium 5, the filtered fuel can flow along the inner face 5a within the inner space 9, for example downwards while being channeled by spiral reliefs of the reinforcing member 8. After passing through the reinforcing member 8 via openings (here bottom openings 80), the filtered fuel can flow (here upward) around and along the insertion portion 31 to reach the outlet port 3b. In the embodiment of FIG. 1, one can see a venturi 22 located between the fuel inlet and outlet ports 3a-3b, creating a localized negative pressure upstream of the outlet port 3b. In this example, the filtered fuel passes through the venturi 22 which is designed to lie in a transverse direction which is preferably perpendicular to the longitudinal axis A.

The venturi 22 is arranged in the sealing portion 30 of the cover 3 and the dispensing port 34 opens into the narrowed area of the venturi 22. The venturi 22 thus forms a means of generating a pressure difference between one among the fuel inlet 3a and outlet 3b ports and the dispensing port 34. In the example shown, the dispensing port 34 is near the outlet port 3b, so that the liquid additive is mixed into the filtered fuel and in a portion of the downstream area Z2 located entirely outside the bowl 2.

Example configurations of the additive chamber E with connection to the filter element 4 and to the insertion portion 31 of the cover 3 will now be described with reference to FIGS. 1 to 6.

The additive chamber E here has an outer casing 12 which can be obtained by a fluidtight connection of an annular part 24 to a vessel 25 that is distinct from the bowl 2. The vessel 25 and the annular part 24 may be rigid. This configuration with an outer casing 12 makes it possible to protect the integrity and fluidtightness of the at least partially flexible tank 13, and to facilitate connection and assembly with the filter element 4, for example by the use of guiding and/or attachment surfaces 24a formed on the annular part 24. This also ensures that the fuel around the additive tank 13 is clean.

Traversing this outer casing 12 is a liquid additive outlet pipe 12a, preferably unique, which is defined by an external connection 28. The outer casing 12 comprises at least one fuel port O1 to allow fuel to enter the additive chamber E, around the tank 13. As shown in FIGS. 1 and 3, the tank 13 may be composed of a flexible fluidtight wall P, here forming a bowl, and an upper wall PS, preferably rigid in its central portion. The tank 13 extends inside the outer casing 12 and the wall P is movable and fluidtight between the internal volume V2 of the tank 13 and a peripheral volume V3 defined by the outer casing 12. It is understood that this wall P provides a fluidtight separation and also maintains equal pressure between the additive in the tank 13 and the fuel in the additive chamber E.

Although the figures illustrate the case of an outer casing 12 with a vessel 25 separate from the bowl 2, alternatively a vessel 25 which defines one end of the filter housing may be used, which allows eliminating the bowl 2. The vessel 25 then has a connection interface which can be attached, for example by screwing, to the cover 3 (with threading that can be similar to what is illustrated in FIG. 9A). With this option, the annular part 24 can remain identical or similar to the example of FIGS. 1-6. It is also possible to replace the proximal flange 7 and annular part 24 by a single part.

Figure 6:
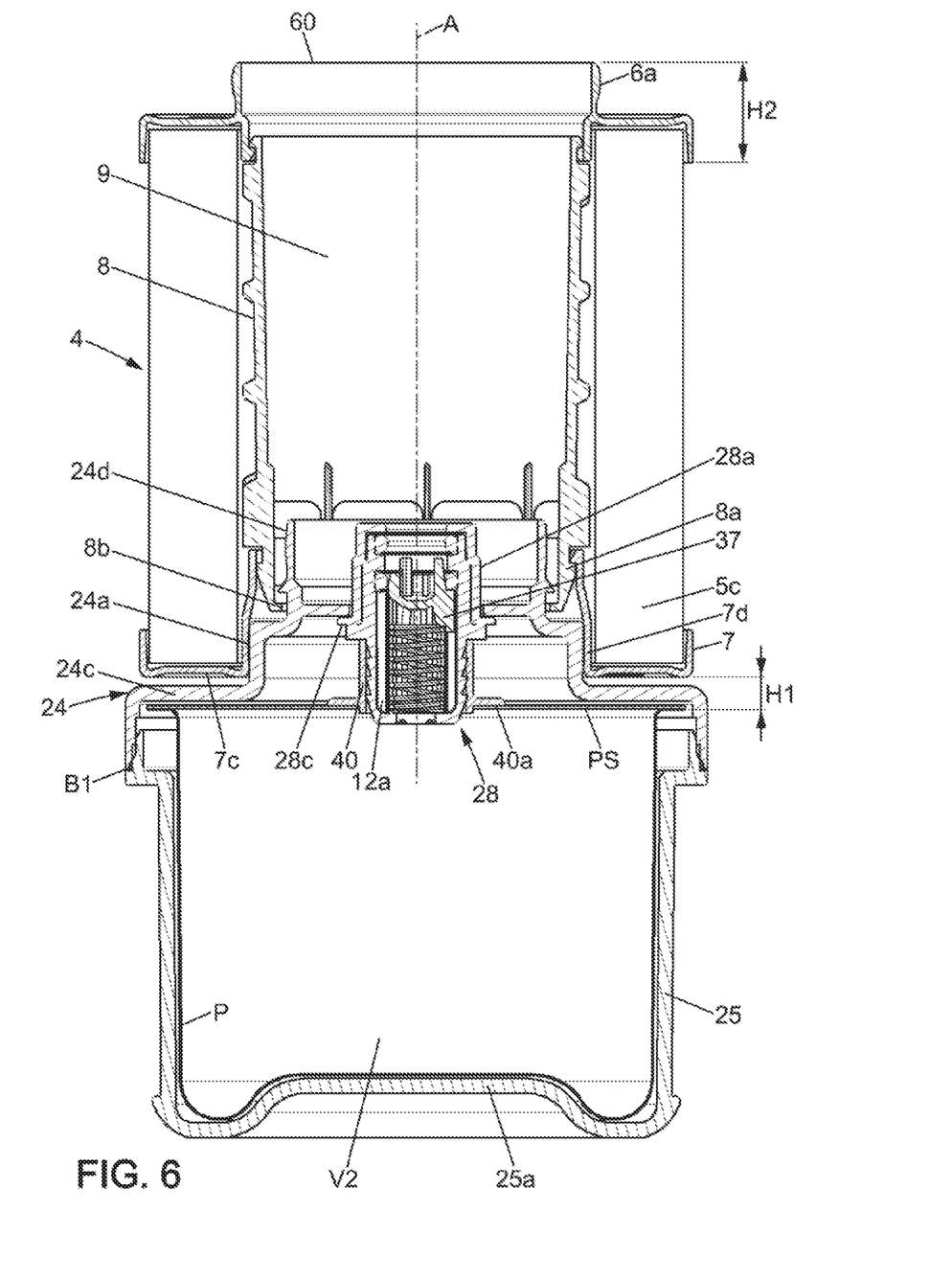
FIG. 6 shows a detail view of the attachment of the additive chamber, and also a cartridge variant.

In the example of FIG. 3, the upper wall PS comprises the external connection 28 and extends transversely to the longitudinal axis A. The outer edge of the upper wall PS is preferably non-deformable and fixed relative to the outer casing 12, and allows maintaining an annular shape of large diameter for the upper portion of the wall P. The tank 13 is thus deformable and comparable to a flexible pouch and can be emptied by an upward thrust on the wall P without creating dead volume. The material of the wall P may be a deformable membrane, possibly of elastomer (a fluoroelastomer) by way of non-limiting example. The attachment of the membrane is of a type that is known per se, for example by trapping the membrane edge in a fluidtight seal. The rigid bottom 25*a* of the vessel 25 may optionally be in contact with the flexible bottom of the tank 13 when the latter is in the filled state, as can be seen in FIG. 3. In the example of FIG. 6, it should be noted that the membrane forming the wall P is formed by a nonelastomeric flexible plastic. The wall P can then be composed of a plastic film (may be less than 900 μm thick).

Preferably, the external connection 28 extends in a generally tubular manner so as to define the outlet pipe 12*a* and comprises sealing means 36 for automatically closing the outlet pipe 12*a* in a fluidtight manner when the external connection 28 is in a disengaged state, meaning when it is not connected to the connecting endpiece 35 formed on the axial end 32*a* of the dispensing head 32. The connecting endpiece 35 cooperates, here by engaging the outlet pipe 12*a*, with the sealing means 36 so that the distribution channel DC is in communication with the interior of the additive tank 13 when the connecting endpiece 35 is engaged with the external connection 28. It may be arranged that the external connection 28 floats slightly on the annular part 24 (meaning there is a possibility of slight axial movement, typically for a distance of less than or equal to 5 mm) to facilitate assembly and reduce wear of the components internal to the external connection 28, as such wear may sometimes cause leakage of the additive.

In alternative embodiments in which the proximal flange 7 and the annular part 24 are replaced by a single part, it is understood that the filter medium 5 may be bonded in a conventional manner onto said single part (which combines the functions of the flange and of the fluidtight wall of the outer casing 12). For example, said single part may be welded onto the tank 25 before bonding the filter medium 5.

Referring to FIGS. 3 and 5, the self-sealing external connection 28 comprises a body or tubular portion 28*a* with two opposite openings, defining a passage of axis X which may be parallel and possibly coincident with the longitudinal axis A. In the engagement position of the connecting endpiece 35 within the external connection 28, the filter element 4 and the additive chamber E are in a stacked configuration and the sealing means 36 are arranged to permit communication of liquid additive through the outlet pipe 12*a*. The connecting endpiece 35 then extends away from the first end 281 of the external connection 28, in other words away from the opening of the outlet pipe 12*a* into the internal volume V2 of the additive tank 13, and engages with the sealing means 36. On the side of the second end 282 of the external connection 28 (female end 282 corresponding here to the opening of the additive outlet pipe 12*a* into the inner space 9), at least one fluidtight radial contact is created between the lateral outer face of the connecting endpiece 35 and one or more annular gaskets J1, J2 mounted internally within the tubular body 28*a*.

In the example of FIGS. 5 and 6, here the tubular-body 28*a* of the external connection 28 passes through the upper wall PS and has, on its lateral face, external annular projections forming circumferential flanges 28*b* of triangular cross-section, resembling a fir tree. The tubular body 28*a* is partially inserted into a plastic endpiece 40 forming part of the tank 13. This endpiece 40, which is typically welded onto the upper wall PS, projects axially outward relative to the upper wall PS of the liquid additive tank 13. This endpiece 40 defines a passage of preferably constant cross-section to engage with the end 281, here in the form of a fir tree. The circumferential flanges 28*b* deform the flexible material constituting the endpiece 40, forming as many seals as there are consecutive flanges 28*b* in contact with the endpiece 40. A weld area 40*a* is defined between the upper wall PS and the lower face of a lip of the endpiece 40. This weld area 40*a* extends perpendicularly to the axis A.

In a variant with the same type of endpiece 40, the end 281 may have an external annular groove which receives an O-ring. In this case, the end 281 can be locked in place by the engagement of retaining members distributed over the inner face of the endpiece 40 and over the end 281. These are, for example, radially projecting complementary slot element(s) formed in the lower portion of the endpiece 40.

Inside the tubular body 28*a*, along axis X, a valve 37 which is slidably mounted is used to close the outlet pipe 12*a*. The valve 37, which is part of the sealing means 36, is biased towards a closed position by a resilient biasing member 38 such as a spring. The fluidtight seal is obtained for example due to the fact that the annular gasket J2 forms an abutment for an axial surface S2 located on the perimeter of the valve 37. A tubular portion T2 of the valve 37 can then come into radial contact with the gasket J2 when the resilient biasing member 38 is no longer subjected to a constraining force (this constraining force is applied or not applied depending on the positioning of the cartridge CC in the filter 1). This resilient biasing member 38 is, for example, formed by a spring bearing on a seat 39 formed in the first end 281. When the connecting endpiece 35 is removed, it is understood that the valve 37 is moved, here by the thrust of the spring, until it comes into contact with this type of abutment so as to occupy a closed position where it completely seals off the liquid additive outlet pipe 12*a* (as illustrated in FIGS. 3 and 6).

In the non-limiting example of FIGS. 3 and 5, the open state of the sealing means 36 is obtained by thrust against the valve 37, exerted by the connecting endpiece 35 which here is hollow, to place the additive tank 13 in communication with the inner space 9. Insertion of the connecting endpiece 35 corresponds to the mounted state of the cartridge CC on the cover 3, in an attachment configuration of bowl 2 and cover 3 as shown in FIG. 1. It is thus understood, as is clearly visible in FIGS. 3, 5, and 6, that the valve 37 or more generally the sealing means 36 of the external connection 28 are actuated mechanically (here by thrust), independently of the temperature. This simplifies the design of the external connection 28. Preferably, only one valve 37 may be used in the filter cartridge CC.

Of course, the sealing means 36 may have other alternative forms. The valve 37 of the sealing means 36 is therefore not necessarily in fluidtight radial contact with the tubular body 28*a*, and may be in the form of a ball or a piston which seals off a passage opening in an axially fluidtight manner. When using at least two gaskets J1, J2 in the external connection 28, it may be arranged that these gaskets J1, J2 are each effective over a given temperature range which may be different. As a non-limiting example, the fluidtightness may be improved by distributing two gaskets J1, J2 over an axial distance that is optionally at least equal to the inner diameter D of the inlet E1 defined by the connecting endpiece 35.

In the example of FIG. 3, the design of the upper wall PS is different, so that it comprises the tubular body 28*a* of the external connection 28 (molded as one part). With this configuration, there is a shorter chain of positioning allowances for the connecting endpiece 35 relative to the additive chamber E. This eliminates the need for added tolerances when producing intermediate parts to ensure accurate positioning of the first axial end 32*a* of the dispensing head 32.

The distal flange 6 provides a central opening 60 having a first inner diameter D1 which may be less than or substantially equal to the maximum diameter D3 of the additive chamber E (which here is at least as wide as the distal flange 6 in the example of FIGS. 1-6) but greater than the diameter (or equivalent diameter) of the insertion portion 31, to enable engagement of the latter into the inner space 9 during the step of connecting the dispensing head 32. To enable assembly of the filter cartridge CC, it is understood that the proximal flange 7 has a central opening 70 having a second inner diameter D2 of similar dimensions to the first inner diameter D1. To optimize the arrangement in the housing and to reduce the overall size of the filter 1, the following relationship can then be satisfied for these diameters:

$$0.5 \leq D1/D3 \leq 1 \text{ and } 0.5 \leq D2/D3 \leq 1$$

According to one feature, when the cartridge CC is not installed in the filter housing, a plug (not shown) is provided on the upper portion formed by the distal flange 6 in order to avoid fouling of the external connection 28 and peripheral volume V3. This plug may seal the opening 60 (visible in particular in FIG. 3) that allows access to the inner space 9 through the distal flange 6.

Figure 4:
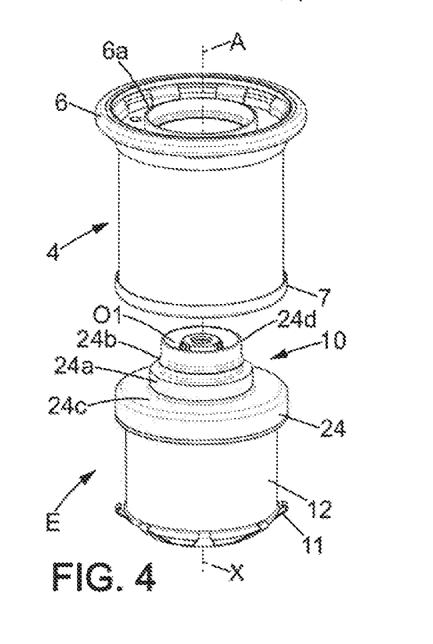
FIG. 4 is an exploded perspective view illustrating the cartridge of FIG. 3.
Figure 8:
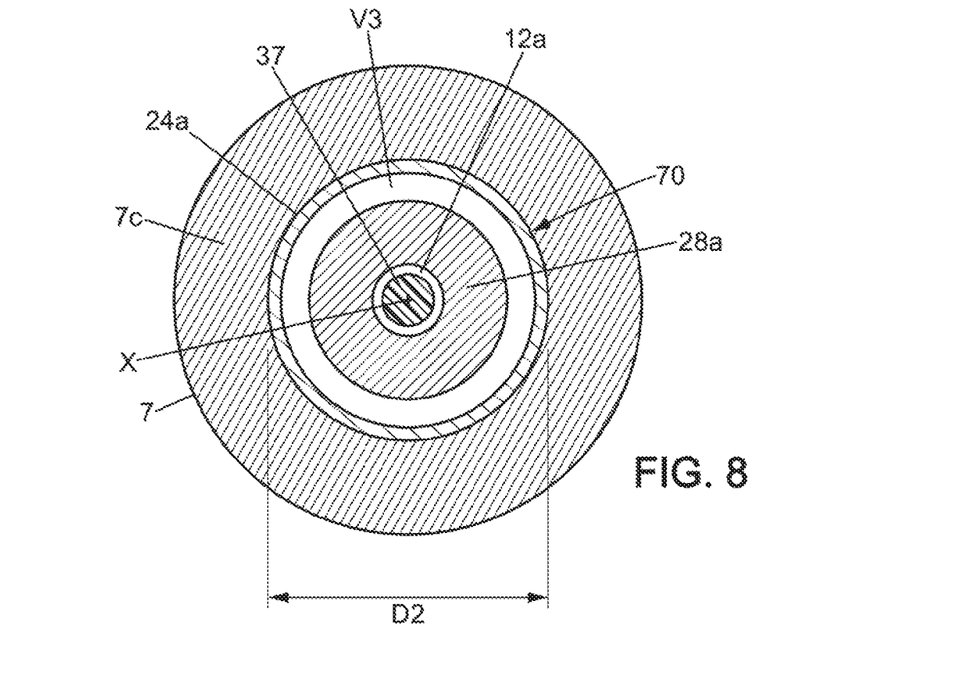
FIG. 8 shows a schematic cross-sectional view of the filter cartridge, at the interface between the attachment end and the proximal flange.

As illustrated in FIG. 4, in practice it is advantageous that the attachment end 10 of the additive chamber E has rotational symmetry, to facilitate assembly with the filter element 4. In this case, the axis X of the passage defined by the tubular body 28a is coincident with the longitudinal axis A of the filter element 4. FIG. 8 also shows the rotational symmetry of the attachment end, in the plane of the radial portion 7c of the proximal flange 7. However, it is understood that the axis X of the passage may be offset laterally relative to the central axis of the annular part 24, the connecting endpiece 35 then being correspondingly offset relative to the longitudinal axis A when the filter cartridge CC is engaged with the insertion portion 31 of the cover 3. The correct angular position can easily be obtained in this case by the use of guide means and/or a position indicator (marking) placed on the distal flange 6.

Referring to FIGS. 3-4 and 8, the annular part 24 of the outer casing 12 comprises the attachment end 10 and a radial portion 24c extending parallel to the radial portion 7c of the proximal flange 7. The attachment end 10 extends through the opening 70 defined by the radial portion 7c (this portion 7c having an annular shape). The external connection 28 may also traverse this opening 70. In this non-limiting example, the attachment end 10 projects axially relative to the radial portion 24c and surrounds the tubular body 28a of the external connection 28 (the latter thus extending at a radial distance from inner face 5b of the filter medium 5, the proximal flange 7, and the optional reinforcing member 8).

As can be seen in FIG. 3, the attachment end 10 extends along the proximal flange 7 and allows attaching the additive chamber E on the filter element 4. The attachment end 10 comprises a sealing lip 24d or a bead adjacent to a free edge. This sealing lip 24d is intended to form an annular area of sealing contact, preferably a radial contact, with a corresponding annular inner face of the lower end 31a that inserts into the inner space 9 until adjacent to the proximal flange 7. Alternatively, the bead or similar sealing lip may be formed at the end of the insertion portion 31 in order to cooperate with an annular surface of the attachment end 10.

The attachment end 10 further comprises an annular guiding and sealing surface portion 24a (here a cylindrical bearing) extending annularly from the area where it joins the radial portion 24c of the annular part 24. The proximal flange 7 comprises, on an axially extending portion connected to the inner edge of the radial portion 7c, a continuous annular surface 7d which is in sealed annular contact with the surface portion 24a in the cartridge CC.

Similarly, the distal flange 6 has a sealing lip 6a which is in sealing contact with a corresponding continuous surface of the sealing portion 30 (for example at a tube). With these two fluidtight areas at the flanges 6 and 7, the filter element 4 is sealingly interposed between the annular space 21 of the upstream area Z1 and the inner space 9 which is only in communication with the outlet port 3b as shown in FIG. 1.

Referring now to FIGS. 3, 4, and 6, it can be seen in this example that the annular part 24 has a dome shape and extends between a large annular edge B1 connected to the vessel 25 and a small annular edge B2 which defines a passage for the external connection 28. Here, the external connection 28 is separate from the annular part 24, through which it is inserted. A collar 28c formed on the periphery of the tubular body 28a limits axial movement of the external connection 28 relative to the annular part 24. Due to this retention, the sealed connection between the end 281 and the upper wall PS of the tank 13 is maintained against forces exerted during insertion or withdrawal of the connecting endpiece 35. Of course, other forms of attachment may be used to keep the external connection 28 integrally secured to the additive chamber E.

For connecting the additive chamber E to the filter element 4, among the simple and reliable options for an assembly with reduced overall footprint, it is advantageous to provide a nested insertion of the attachment end 10. This nesting is obtained, for example:

with a connection, here fluidtight, by contact and friction between the surface portion 24a and the continuous surface 7d of the proximal flange 7; and/or with snap-fitting by means of clips 24b projecting radially outward from a peripheral surface of the attachment end 10, the clips 24b engaging when positioned beyond one or more abutments 8b that are part of the filter element 4.

In the non-limiting example of FIGS. 4 and 6, the additive chamber E is mounted so as to be inseparable from the filter element 4 by nested insertion into the inner space of the attachment end 10. The clips 24b oppose withdrawal of the attachment end 10 due to the abutment 8b formed at the lower end 8a of the reinforcing member 8. Alternatively, such an abutment may be formed by at least one annular inner lip of the proximal flange 7.

Although these figures show protruding clips 24b arranged in the annular part 24 between the annular surface portion 24a and the sealing lip 24d, other possibilities for retention may be provided, for example protruding reliefs of the proximal flange 7 engaging with apertures formed in the attachment end 10.

More generally, it is understood that the attachment end 10 provides fastening means which may extend beyond the lower end 5c of the filter medium to allow connection of the additive chamber E without adding additional height to the dimensions. One will note in FIG. 6 that the axial distance H1 between the lower end 5c of the filter medium 5 and the upper wall PS of the additive chamber 13 can be small (less than 10 mm for example) and typically less than or equal to the height H2 of the distal flange 6.

Controlling the release of additive from the tank 13 of the additive chamber E to the dispensing port 34 will now be described with reference to FIGS. 1 and 5.

The dispensing head 32 here comprises a solenoid valve or similar actuator device 62 enabling the total or partial sealing of the distribution channel DC. The dispensing head 32 also comprises an external sleeve F to protect the actuator device 62. This protective sleeve F may also comprise a communication line 50 which allows filling the peripheral volume V3 with fuel. The fuel pressure in the peripheral volume V3 is identical to the pressure of the filtered fuel flowing in the fuel channel of the cover 3 upstream of the venturi 22, except for the head loss generated by the design.

In the non-limiting example of FIG. 1, this communication line 50 is separated in a fluidtight manner from the compartment 64 where the solenoid valve or similar functional component is housed. The fuel therefore does not enter or surround the solenoid valve nor does it enter the inlet E1 which forms for example an exit from the compartment 64. Part of the distribution channel DC is formed by a tube which is mounted in a support S3 placed between the actuator device 62, here the solenoid valve, and the sealing portion 30 of the cover 3.

During operation of the filter 1, the fuel flows continuously between the fuel inlet and outlet ports 3a and 3b. The venturi 22, which here constitutes the pressure difference generation means, generates a negative pressure between the additive dispensing port 34 and the fuel outlet port 3b. As the additive chamber E is in communication with the fuel outlet port 3b via the line 50, the peripheral volume V3 is filled with fuel at the same pressure as the fuel flowing at the fuel outlet port 3b. The wall P of the additive tank 13, which is here a mobile and fluidtight wall, maintains an identical pressure between the additive in the additive tank 13 and the fuel in the peripheral volume V3.

The pressure in the additive tank 13 is therefore greater than the pressure at the dispensing port 34, which forces the additive to move from the tank 13 to the dispensing port 34 and then diffuse into the fuel flowing through the venturi 22 and thus into the fuel circulation circuit C1. The actuator device 62 allows preventing or reducing the flow of additive. For example, a solenoid valve is used to stop the release of additive when the engine is off. A solenoid valve of a type that is known per se may be used, with a sealing member suitable for sealing off the distribution channel DC. For example, a conventional sealing member (not shown) is used that is movable in the axial direction, parallel to the longitudinal axis A. The sealing member in the closed position bears on a seat that is usually located in an joining area between two sections of the distribution channel DC.

In this embodiment, the actuator device 62 is illustrated as an electromechanical means for total or partial sealing of the additive distribution channel DC. The use of such a means is optional, however, and the invention can of course be implemented without sealing off the distribution channel DC or by using other means for sealing off the additive distribution channel, such as a thermal valve, an "umbrella" valve, a check valve, or a hydraulically controlled valve.

In addition, in a non-limiting example, the additive may be heated prior to injection into the fuel circulation circuit C1. According to a preferred option, the additive which exits the tank 13 is heated before entering the distribution channel DC. A heating-surface member can thus be placed near or in the first axial end 32a. The additive is heated to a temperature of, for example, between 30 and 60° C. One of the advantages related to heating the additive is that this allows its distribution through the distribution channel DC at a substantially constant temperature, and therefore at a constant viscosity. When the distribution channel DC is formed by capillary tubing (very small diameter), eliminating variations in the additive viscosity enables precise control of the amount of additive injected. Such heating is particularly useful in compensating for viscosity variations due to localized heating not controlled by the actuator device 62.

To optimize the heat exchange (minimize heat loss and the energy required for heating), it is preferred to heat the additive near the inlet of the distribution channel DC rather than the additive contained in the tank 13.

In one embodiment, the dispensing head 32 may have a heating device (not shown), for example electric, provided with a connector which is externally accessible on the cover 3 or similar portion of the housing. A connecting wire, for example embedded in the side wall, of the dispensing head 32, can be used to establish the connection between the connector and the heating-surface member of the heating device. The heating-surface member may be provided on a board or similar electronic circuit component. In this case, the heating surface is typically formed by one or more PTC (Positive Temperature Coefficient) heating elements.

Alternatively, heating may result at the first axial end 32a by heating the fuel which then passes through the filter medium 5 and can enter a channel which traverses and/or surrounds the first axial end 32a. More generally, it is understood that the additive may be heated upstream of the dispensing port 34, preferably between the connecting end-piece 35 and an inlet of the distribution channel DC.

In alternative embodiments of the additive module, the peripheral volume V3 may be filled with fuel from the upstream area Z1, or the additive tank 13 may be brought to the pressure of another fluid and/or the pressure from a pressure generator.

One advantage of the invention lies in the possibility of reusing the two portions (2, 3) of the external housing, providing a filter cartridge CC of lower cost and offering greater flexibility for attachment to the vehicle. Assembly of the cartridge CC is also easy, possibly using an attachment end specific to a given combination of filter element 4 and additive module having compatible properties (including useful life).

The method of assembling the filter element 4 with the additive chamber E allows eliminating contact with the outlet of the additive tank 13. In addition, assembly is ergonomic, reducing the overall height of the filter 1 because of the possibility of nesting the attachment portion 10 within the inner space 9 of the filter element 4. In the non-limiting example of the figures, there is no need for a gasket to be inserted between the filter cartridge CC and the housing (2, 3), which reduces the number of parts to be manipulated during installation or removal of the cartridge CC. It is understood that this does not exclude alternative options with a separating gasket that can be changed when replacing the cartridge CC.

Another advantage is the use of a flexible tank 13 which can fully contract and close in on itself due to the ability of the wall P, initially bowl-shaped, to approach the upper wall PS unhindered (as liquid additive is gradually released into the circuit C1). Of course, the tank 13 may have a different geometry than a simple pouch with a rounded bottom, and the example of the figures is given only by way of illustration.

The device of the invention allows conveying any type of additive contained in a fuel. These additives can be classified into two categories: those which have a catalytic function to assist the regeneration of particulate filters (PF), usually referred to as Fuel Borne Catalysts (FBC), and those which have a function other than a catalytic function.

The additives may be in liquid or solid form.

FBC additives may be in the form of a salt or an organometallic complex, or a mixture of these salts or complexes, soluble or dispersible in the fuel. They may also be in the form of a colloidal dispersion. The colloids of this dispersion may be based on a compound of a rare earth and/or a metal selected from groups IIA, IVA, VIIA, VIII, IB, IIB, IIIB, and IVB of the periodic table.

More particularly, they may be cerium-based and/or iron-based compounds.

The periodic table referred to above is the one published in the Supplement to the Bulletin de la Societe Chimique de France, No. 1 (January 1966).

It is also possible to use colloidal dispersions which comprise detergent compositions.

For examples of colloidal dispersions, we can mention those described in patent applications EP 671205, WO 97/19022, WO 01/10545, and WO 03/053560, the latter two describing dispersions respectively based on cerium and iron compounds, these dispersions also containing an amphiphilic agent.

Applications WO 2012/084838 and WO 2012/084851 disclose iron dispersions in crystalline form which may also be used.

We can also mention applications WO 2010/150040, WO 2012/084906, and WO 2012/097937, which describe colloidal dispersions based on an iron compound, an amphiphilic agent, and a detergent composition comprising a quaternary ammonium salt.

Other types of known additives, which are not FBCs and which have a function other than a catalytic function, may also be injected in the fuel circuit. These additives improve fuel distribution in the engine and/or engine performance and/or engine stability during operation.

Examples are defoamers, deicing additives, polymer additives reducing the temperature at which the fuel clouds or freezes, and flow improving additives.

Corrosion inhibiting additives may also be used.

Additives to improve engine performance may also be used, such as cetane boost additives, octane boost additives, smoke inhibiting additives, friction modifier (FM) additives, or "extreme pressure" additives.

Detergent additives intended to reduce deposits at the injectors may also be used.

Lubricity improver additives may also be used to prevent wear or seizing, particularly in the high-pressure pumps and injectors, as fuel lubricity is poor.

Additives to improve engine stability during operation may be considered: antioxidants, stabilizers, metal deactivating agents to neutralize the catalytic effects of certain metals, dispersants to disperse formed particles and prevent agglomeration of relatively large particles may also be used.

According to one particular embodiment, the additive is a combination of a detergent additive and a lubricant additive, and possibly a corrosion inhibiting additive.

An FBC-type additive associated with a detergent-type fuel performance additive as described above (Patent Application WO 2010/150040) is particularly advantageous in the case of a vehicle equipped with a particulate filter.

In the same case, it is also advantageous to associate multiple fuel performance additives with an FBC-type additive, particularly when the vehicle is sold in a geographic area where fuel is of variable and/or poor quality.

In the case of a vehicle not equipped with a particulate filter, various types of additive combinations can be considered, such as one combining one or more detergents with a lubricant additive and a corrosion inhibitor.

It should be obvious to those skilled in the art that the invention allows embodiments to take many other specific forms without departing from the scope of the invention as claimed. In particular, although the description mentions a few examples for the implementation of fluidtight sealing areas, a person skilled in the art understands that any other embodiment providing an annular seal is suitable for the sealing area between the filter element 4 and the cover 3 (the same is true for a sealing area between the filter element 4 and the additive chamber E).

In addition, it is understood that the pressure difference is not necessarily generated by a phenomenon of negative pressure, for example by a venturi 22 (the use of a diaphragm being an alternative to the venturi 22), and can also result from the creation of a positive pressure exerted on the outer face of at least one wall P of the additive tank 13. It is also understood that the pressure difference generation means may be the filter-element 4; in this case the sealing portion 40 can be without a venturi and the communication line 50 formed in the insertion portion 31 can be eliminated.

The invention claimed is:

1. A filter cartridge suitable to form part of a fuel filter and adapted to filter fuel inside a filter housing of the fuel filter, said filter cartridge comprising:
    a filter element comprising a first end, a second end, and an annular filter medium extending between the first end and the second end, the annular filter medium having an inner face which defines an inner space;
    an additive module comprising:
    a casing comprising a fluid tight movable wall for external contact with a fuel, the casing forming a liquid additive tank for being brought to a fuel pressure due to a contact with the fuel, the casing delimiting a variable internal volume so that an identical pressure is maintained between the liquid additive contained in the internal volume and the fuel,
    an outer casing defining a peripheral volume around the additive tank,
    a liquid additive outlet pipe, the liquid additive being suitable for mixing with the fuel flowing in a fuel circulation circuit,
    wherein the additive module comprises an attachment end in contact with the filter element, the attachment end being retained to the filter element due to an abutment performed by the attachment end relative to the filter element, whereby the filter element and the additive module cooperate to form a single unit for removable attachment to the filter housing of the fuel filter,
        wherein the additive module comprises an external connection which comprises the additive liquid outlet pipe, the external connection having a sealing interface for automatically closing the liquid additive outlet pipe in a fluidtight manner when the external connection is in a disengaged state,
        and wherein said additive tank extends inside the outer casing, the outer casing having at least one fuel port allowing fuel to enter the peripheral volume, the at least one fuel port opening into said inner space so that fuel filtered centripetally by the annular filter medium can circulate both in the inner space and in the peripheral volume.

2. The filter cartridge according to claim 1, wherein the second end of the filter element is engaged with said attachment end so as to stack and/or nest the filter element and the additive module, whereby the filter element and the additive module define a unit adapted for integral insertion into a fuel filter housing.

3. The filter cartridge according to claim 1, wherein the additive module consists of an additive chamber which comprises:

the outer casing,
said additive tank, which extends inside the outer casing and has at least one flexible fluidtight portion, including said fluidtight movable wall, to allow the internal volume to vary,
the liquid additive outlet pipe being distinct from the at least one fuel port and extending within or adjacent to the inner space by traversing the attachment end.

4. The filter cartridge according to claim 3, wherein the at least one fuel port directly opens into said inner space.

5. The filter cartridge according to claim 3, wherein the second end of the filter element comprises a proximal flange that is proximal relative to the additive chamber, the attachment end of the additive chamber being retained by the proximal flange and/or by a reinforcing member of the filter element which extends in the inner space.

6. The filter cartridge according to claim 5, wherein the attachment end of the additive chamber comprises an annular part which extends around the liquid additive outlet pipe, retention of the attachment end being achieved by nested insertion of said attachment end into the inner space with engagement of the annular part against or beyond an abutment that is part of the filter element.

7. The filter cartridge according to claim 6, wherein the additive module comprises a vessel extending around the casing and forming part of the outer casing,
and wherein the outer casing of the additive chamber is obtained by fluidtight connection of the annular part to the vessel, the annular part having a dome shape and comprising:
a large annular edge connected to the vessel;
at least one small annular edge defining a passage for the external connection when the external connection is separate from the annular part and is inserted through the annular part.

8. The filter cartridge according to claim 5, wherein the proximal flange is a single piece and comprises:
a radial portion which covers an axial end of the annular filter medium, the radial portion having an annular form and defining an opening traversed by the external connection; and
an extension portion distinct from the radial portion, having an annular guiding and/or sealing surface in contact with an annular surface portion of the attachment end.

9. The filter cartridge according to claim 1, wherein the external connection comprises:
a rigid body formed as a single piece and defining the liquid additive outlet pipe; and
at least one movable member placed in the liquid additive outlet pipe and in contact with the rigid body;
the additive tank comprising a wall formed as a single piece which includes the rigid body.

10. The filter cartridge according to claim 1, wherein the sealing interface comprises a shutter valve urged by default into a closed position by a resilient biasing member.

11. The filter cartridge according to claim 3, wherein the external connection extends longitudinally between a first end where the liquid additive outlet pipe opens into the internal volume of the additive tank and a second end where the liquid additive outlet pipe opens into the inner space delimited by the annular filter medium.

12. The filter cartridge according to claim 11 when dependent on claim 3, wherein the second end of the filter element comprises a proximal flange that is proximal relative to the additive chamber,
and wherein the filter element has a distal flange that is distal relative to the additive chamber and forms a cartridge end, the additive chamber comprising a rigid base located opposite said cartridge end, the fuel port and the second end of the external connection being arranged in the additive chamber so as to be opposite said rigid base and closer to the proximal flange than to the distal flange.

13. The filter cartridge according to claim 12, wherein the distal flange has a central opening having a first inner diameter D1, the proximal flange has a central opening having a second inner diameter D2, and the additive chamber defines a maximum outer diameter D3 such that:

$0.5 \leq D1/D3 \leq 1$ and $0.5 \leq D2/D3 \leq 1$.

14. A fuel filter comprising a filter cartridge and a housing for accommodating the filter cartridge,
wherein the filter cartridge comprises:
a filter element comprising a first end, a second end, and an annular filter medium, the annular filter medium having an inner face which defines an inner space;
an additive module comprising:
a casing comprising a fluid tight movable wall for external contact with filtered fuel, the casing forming a liquid additive tank for being brought to a fuel pressure due to a contact with filtered fuel, the casing delimiting a variable internal volume so that an identical pressure is maintained between the liquid additive contained in the internal volume and the filtered fuel,
an outer casing defining a peripheral volume around the additive tank,
a liquid additive outlet pipe, the liquid additive being suitable for mixing with the fuel flowing in a fuel circulation circuit,
wherein the additive module comprises an attachment end in contact with the filter element, whereby the filter element and the additive module define a unit for attachment removably and as a single part to a housing portion of the housing,
wherein the additive module comprises an external connection which comprises the additive liquid outlet pipe, the external connection having a sealing interface for automatically closing the liquid additive outlet pipe in a fluidtight manner when the external connection is in a disengaged state,
wherein said additive tank extends inside the outer casing, the outer casing having at least one fuel port allowing fuel to enter the peripheral volume, the at least one fuel port opening into said inner space so that filtered fuel filtered centripetally by the annular filter medium can circulate both in the inner space and in the peripheral volume,
and wherein the housing comprises:
a fuel inlet port;
a fuel outlet port;
an additive dispensing port for dispensing liquid additive into a fuel circulation circuit for an internal combustion engine, the additive dispensing port being distinct from the fuel inlet port and the fuel outlet port; and
a dispensing head which comprises the additive dispensing port for releasing additive into the fuel circulation circuit, a connecting endpiece configured to engage with the external connection, and a distribution channel for circulating the liquid additive from the connecting endpiece to the additive dispensing port, the connecting endpiece engaging with the sealing interface so that the distribution channel is in communication with the additive tank when the connecting endpiece is in an engaged state with the external connection.

15. The fuel filter according to claim 14, wherein the housing is formed by assembling a cover comprising the dispensing head with a bowl, the dispensing head being intended for assembly with the cover, the cover comprising the fuel inlet port and the fuel outlet port, the filter cartridge being removably mounted on the cover, said distribution channel extending into the inner space delimited by the annular filter medium.

16. The fuel filter according to claim 14, wherein the second end of the filter element comprises a proximal flange that is proximal relative to the additive module,
and wherein the filter element is sealingly interposed between an upstream area around the filter cartridge, which is in communication with the fuel inlet port, and a downstream area which includes the inner space delimited by the annular filter medium and is in communication with the fuel outlet port, the attachment end of the additive module being in radial sealing contact against an annular surface portion of the proximal flange, at a distance from the external connection.

17. The fuel filter according to claim 14, comprising:
a means for generating a pressure difference between the fuel inlet port or the fuel outlet port and the additive dispensing port, and
a device for selectively sealing, totally or partially, the distribution channel, engaged in the inner space delimited by the annular filter medium.

18. The fuel filter according to claim 17, wherein said means for generating a pressure difference comprises a venturi located in the dispensing head, the dispensing head comprising a communication line, extending in the inner space, for circulation toward the venturi of fuel filtered centripetally by the annular filter medium.

* * * * *